United States Patent
Zucker et al.

(10) Patent No.: US 9,140,864 B2
(45) Date of Patent: Sep. 22, 2015

(54) METHODS FOR LIGHT COUPLING INTO POWER SEMICONDUCTORS

(75) Inventors: Oved S. F. Zucker, Annandale, VA (US); Yeuan-Ming Sheu, Berwyn Heights, MD (US); Yannick C. Morel, Falls Church, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 157 days.

(21) Appl. No.: 13/467,049

(22) Filed: May 9, 2012
(Under 37 CFR 1.47)

(65) Prior Publication Data

US 2012/0288232 A1    Nov. 15, 2012

Related U.S. Application Data

(60) Provisional application No. 61/483,784, filed on May 9, 2011.

(51) Int. Cl.
*G02B 6/42* (2006.01)
*G02B 6/34* (2006.01)

(52) U.S. Cl.
CPC ............... *G02B 6/4295* (2013.01); *G02B 6/34* (2013.01); *G02B 6/4214* (2013.01)

(58) Field of Classification Search
CPC ...... G02B 6/34; G02B 6/4214; G02B 6/4295; G02B 6/4204; H01L 31/113; Y10S 257/918
USPC .......................................................... 385/31
See application file for complete search history.

(56) References Cited

U.S. PATENT DOCUMENTS

| | | | | |
|---|---|---|---|---|
| 4,282,542 | A * | 8/1981 | Silber et al. | 257/115 |
| 4,841,350 | A * | 6/1989 | Nishizawa | 257/113 |
| 5,742,716 | A * | 4/1998 | Yamashita et al. | 385/33 |
| 6,218,682 | B1 * | 4/2001 | Zucker et al. | 257/113 |
| 6,995,408 | B2 * | 2/2006 | Mariyama et al. | 257/119 |
| 7,157,747 | B2 * | 1/2007 | Mariyama et al. | 257/119 |
| 7,423,298 | B2 * | 9/2008 | Mariyama et al. | 257/119 |
| 7,582,917 | B2 * | 9/2009 | Sheu | 257/113 |
| 2004/0262633 | A1 * | 12/2004 | Mariyama et al. | 257/197 |

(Continued)

OTHER PUBLICATIONS

Berman et al., "High Efficiency Silicon Solar Cells", Report No. 1, 1962. DTIC, AD 295056. (available at www.dtic.mil/dtic/tr/fulltext/u2/295056.pdf).*

(Continued)

*Primary Examiner* — Peter Radkowski
(74) *Attorney, Agent, or Firm* — Praskash Nama; Daniel J. Long

(57) ABSTRACT

Disclosed is a method of coupling light into a power semiconductor device having a semiconductor structure with two or more layers. The power semiconductor device has multiple cells of functionally identical units linked by multiple interconnects. In each device unit, a patterned electrode layer is disposed on the surface of the semiconductor structure. The method includes illuminating the power semiconductor device by directing a light from a light source through the patterned electrode layer to form an enhanced light coupling with the semiconductor structure. The patterned electrode layer is configured to have a micron scaled grid pattern having multiple metal grids and aperture openings that is based on a distributed resistance model having two characteristic current decay lengths.

12 Claims, 16 Drawing Sheets

(56) References Cited

U.S. PATENT DOCUMENTS

| | | | |
|---|---|---|---|
| 2005/0001332 | A1 | 1/2005 | Giorgi et al. |
| 2005/0006661 | A1* | 1/2005 | Mariyama et al. ............ 257/107 |
| 2005/0047459 | A1* | 3/2005 | Weidenheimer et al. ....... 372/43 |
| 2006/0027832 | A1* | 2/2006 | Mariyama et al. ............ 257/118 |
| 2007/0210328 | A1* | 9/2007 | Sheu ............................ 257/107 |
| 2009/0007966 | A1* | 1/2009 | Isaka et al. .................... 136/259 |
| 2011/0284920 | A1* | 11/2011 | Glidden et al. ............... 257/116 |

OTHER PUBLICATIONS

Berman et al., "High Efficiency Silicon Solar Cells", Report No. 2, 1963. DTIC, (available at www.dtic.mil/cgi-bin/GetTRDoc?AD=AD0402838).*

Schumacher, Jurgen, "Numerical simulation of silicon solar cells with novel cell structures," Dissertation, 2000.*

Davis, Max, "Electrical, Mechanical, and Thermal Modeling of Photovoltaic Modules. An Overview," Steel & Silicon Engineering, Feb. 18, 2010. (available at http://steelandsilicon.com/pubs/Modeling%20of%20PV%20Modules_20100216.pdf.).*

Levinshtein, M.E.; Ivanov, P.A.; Agarwal, A.K.; Palmour, J.W., "Optical switch-on of silicon carbide thyristor," Electronics Letters, vol. 38, No. 12, pp. 592,593, Jun. 6, 2002.*

Kunz O; Varlamov S; Aberle A, 2009, 'Modelling the Effects of Distributed Series Resistance onto Suns-Voc, m-Voc and Jsc-Suns Curves of Solar Cells,', in Photovoltaic Specialist Conference (PVSC), 2009, 34th IEEE, IEEE, presented at 34th IEEE Photovoltaic Specialists Conference, Philadelphia, Jun. 7-12, 2009.*

Weise, T.H.G.G.; Schuenemann, B.; Keller, R.; Pzybilla, J., "Performance spectrum of optical triggered thyristor switches for electric weapon system," Electromagnetic Launch Technology, 2004. 2004 12th Symposium on , vol., No., pp. 252,254, May 25-28, 2005.*

Stout, P. Modeling Optically Activated High Power Semiconductor Switches, PhD, 1995, University of Illinois.*

Stout, Phillip J.; Kushner, Mark J., "Modeling of high power semiconductor switches operated in the nonlinear mode," Journal of Applied Physics , vol. 79, No. 4, pp. 2084,2090, Feb. 1996.*

Pulsed Power Engineering Switching Devices, 2009, aviable at http://uspas.fnal.gov/materials/09VU/PPE_Switches.pdf.*

Affordable Switches for Pulsed Power Systems, 2007, available at http://www.empf.org/empfasis/2007/Jan07/aff.html.*

Zutavern, F.J.; Reed, K.W.; Glover, S.F.; Mar, A.; Ruebush, M.H.; Horry, M.L.; Swalby, M.E.; Alexander, J.A.; Smith, T.L., "Fiber-Optic Controlled PCSS Triggers for High Voltage Pulsed Power Switches," Pulsed Power Conference, 2005 IEEE , vol., No., pp. 810,813, Jun. 13-17, 2005.*

* cited by examiner

| PEAK DOPING (CM$^{-3}$) | SHEET RESISTANCE (Ω/SQ) | SPECIFIC CONTACT RESISTANCE (Ω-CM$^2$) | CURRENT DECAY LENGTH FOR METAL (μM) | CURRENT DECAY LENGTH FOR SEMICONDUCTOR (μM) |
|---|---|---|---|---|
| 1x10$^{20}$ | 1.14 | 1x10$^{-6}$ | 9.4 | 46.8 |
| 5x10$^{19}$ | 2.16 | 1x10$^{-6}$ | 6.8 | 34.1 |
| 2x10$^{19}$ | 4.72 | 1x10$^{-6}$ | 4.6 | 23.0 |

| PEAK DOPING ($CM^{-3}$) | SHEET RESISTANCE ($\Omega$/SQ) | SPECIFIC CONTACT RESISTANCE ($\Omega$-$CM^2$) | CURRENT DECAY LENGTH FOR METAL (μM) | CURRENT DECAY LENGTH FOR SEMICONDUCTOR (μM) |
|---|---|---|---|---|
| $1 \times 10^{20}$ | 2.22 | $1 \times 10^{-6}$ | 6.7 | 33.5 |
| $5 \times 10^{19}$ | 4.27 | $1 \times 10^{-6}$ | 4.8 | 24.2 |
| $2 \times 10^{19}$ | 9.79 | $1 \times 10^{-6}$ | 3.2 | 16.0 |

— 700

| PEAK DOPING (CM$^{-3}$) | SHEET RESISTANCE (Ω/SQ) | SPECIFIC CONTACT RESISTANCE (Ω-CM$^2$) | CURRENT DECAY LENGTH FOR METAL (μM) | HALF GRID WIDTH (μM) | HALF GRID SAPCING (OPENING) (μM) |
|---|---|---|---|---|---|
| 1x10$^{20}$ | 1.14 | 1x10$^{-6}$ | 9.4 | 3.0 | 29.0 |
| 5x10$^{19}$ | 2.16 | 1x10$^{-6}$ | 6.8 | 3.0 | 28.2 |
| 2x10$^{19}$ | 4.72 | 1x10$^{-6}$ | 4.6 | 3.0 | 26.4 |

— 800

| PEAK DOPING (CM$^{-3}$) | SHEET RESISTANCE (Ω/SQ) | SPECIFIC CONTACT RESISTANCE (Ω-CM$^2$) | CURRENT DECAY LENGTH FOR METAL (μM) | HALF GRID WIDTH (μM) | HALF GRID SPACING (OPENING) (μM) |
|---|---|---|---|---|---|
| 1x10$^{20}$ | 2.22 | 1x10$^{-6}$ | 6.7 | 3.0 | 28.2 |
| 5x10$^{19}$ | 4.27 | 1x10$^{-6}$ | 4.8 | 3.0 | 26.7 |
| 2x10$^{19}$ | 9.79 | 1x10$^{-6}$ | 3.2 | 3.0 | 23.5 |

| λ (NM) | N CARRIER (CM$^{-3}$) | ABS.DEPTH (UM) | PLIGHT (MJ/CM$^2$) | TOP P-LAYER (UM) | I-LAYER (UM) |
|---|---|---|---|---|---|
| 905 | 1E+17 | 27.8 | 0.5 | 10.0 | 135.0 |
| 980 | 1E+17 | 141.0 | 0.5 | 10.0 | 135.0 |
| 1000 | 1E+17 | 198.9 | 0.7 | 10.0 | 190.0 |
| 1020 | 1E+17 | 316.4 | 1.0 | 10.0 | 300.0 |
| 1040 | 1E+17 | 528.1 | 1.6 | 13.0 | 500.0 |
| 1064 | 1E+17 | 1036.1 | 3.1 | 25.0 | 975.0 |

| ARRAY SIZE (CM X CM) | N | M | PPEAK (W) | DT (US) | E (MJ) | RRMAX (HZ) |
|---|---|---|---|---|---|---|
| 0.5 X 0.5 | 20 | 20 | 0.125 | 10 | 0.5 | 1000 |
| 0.5 X 0.5 | 20 | 20 | 0.125 | 50 | 2.5 | 200 |
| 0.5 X 0.5 | 20 | 20 | 0.125 | 100 | 5.0 | 100 |
| 0.5 X 0.5 | 20 | 20 | 0.125 | 10 | 0.5 | 1000 |
| 0.225 X 0.225 | 9 | 9 | 0.125 | 50 | 0.5 | 200 |
| 0.15 X 0.175 | 6 | 7 | 0.125 | 100 | 0.5 | 100 |
| 1 X 1 | 40 | 40 | 0.125 | 2.5 | 0.5 | 4000 |

| ARRAY SIZE (CM X CM) | N | M | PPEAK (W) | DT (NS) | E (MJ) | RRMAX (KHZ) |
|---|---|---|---|---|---|---|
| 1 X 1 | 16 | 100 | 80 | 10 | 1.3 | 100 |
| 1 X 1 | 16 | 100 | 80 | 50 | 6.4 | 20 |
| 1 X 1 | 16 | 100 | 80 | 100 | 12.8 | 10 |
| 0.96 X 1 | 16 | 100 | 80 | 4 | 0.5 | 250 |
| 0.6 X 0.6 | 10 | 60 | 80 | 10 | 0.5 | 100 |
| 0.24 X 0.3 | 4 | 30 | 80 | 50 | 0.5 | 20 |
| 0.18 X 0.2 | 3 | 20 | 80 | 100 | 0.5 | 10 |

1400

| ARRAY SIZE (CM X CM) | N | M | ELASER (UJ) | DT (PS) | E (MJ) | RRMAX (HZ) |
|---|---|---|---|---|---|---|
| 1 X 1 | 40 | 40 | 2.5 | 10-100 | 4.0 | 1000 |
| 0.875 X 0.875 | 35 | 35 | 2.5 | 10-100 | 3.1 | 1000 |

1500

METHODS FOR LIGHT COUPLING INTO POWER SEMICONDUCTORS

CROSS-REFERENCE TO RELATED APPLICATIONS

This Application claims rights under 35 USC §119(e) from U.S. Application Ser. No. 61/483,784 filed May 9, 2011, and the contents of which are incorporated herein by reference.

BACKGROUND OF THE INVENTION

1. Field of the Invention

The present invention relates to high power semiconductor devices and, more particularly, to light coupling into power semiconductors.

2. Brief Description of Related Art

Typically, turning ON a power semiconductor device, such as a thyristor by introducing a laser pulse into the blocking region and thereby creating carriers, may shorten the current rise time. Turn-ON in this manner may increase the current rise rate from about 10 kA/µs to almost 1 MA/µs. Generally, light is introduced through an aperture of millimeters in size in the upper metallization layer of the semiconductor device. Variations including the apertures extending through the upper p or n layers have also been tried. When the light is introduced to the semiconductor device in such a manner, the light may not penetrate far under the upper metallization and current may only flow in slow sideways spreading whose speed is typically less than 100 µm/µs. Further, less current flows in the central regions of the apertures since no electrode is present to supply the current. This results in the current flowing in and around the peripheral of the aperture. In one existing method, to obtain a faster current rise time, the light was allowed to enter into the semiconductor device through the side between electrodes. This method allows the light to enter through an edge of the voltage holding region of the semiconductor device, which may be a difficult task to obtain efficient light coupling. Further, when the light enters through the edge, the light penetration is shallow. For example, the light penetration is typically shallow and is around 1 mm with a Nd:YAG-laser in Silicon, and very less with laser diode sources in the 900 s µm range. Therefore, this method limits the current conduction to about 1 mm from the edge of the semiconductor device and requires the semiconductor devices to be in the shape of long (narrow) slivers.

In another existing method, the above mentioned limitation was overcome by introducing leaky fibers into many grooves in the semiconductor device electrode spaced at few millimeters apart. The drawback with this method is that the current conduction took place only around the edges of the grooves and not in the middle of the grooves where no electrode was available to supply the current, or even under the electrode away from the groove edge. Thus a large part of the semiconductor device real estate was not utilized. Further, it is difficult to achieve a fiber leak uniformly over a path more than hundred times longer than that of the fiber diameter, when the diameter of the semiconductor device is measured in centimeters (cm) and the diameter of the fiber is, typically, less than 1 mm.

In general, it is recognized that the amount of light necessary for a fast turn-on of the semiconductor device is the one that will generate about $10^{17}$ cm$^{-3}$ inside the semiconductor device. In a blocking semiconductor device of 1 mm in thickness, this translates into about 1 mJ/cm$^2$ of laser energy per unit device area. For a fast turn-ON, the light has to be introduced within, for example, 10~100 ns. This in turn translates into light power density per unit area of about $10^4$~$10^5$ W/cm$^2$ on a semiconductor device. The power density carried by a fiber is limited to around 1 GW/cm$^2$ across the cross section area of a fiber. Thus, for the turn-on the light may be expanded from the exit facet of the fiber to the semiconductor area by 4 to 5 orders of magnitude. Whereas, a leaky fiber, can only illuminate a few hundred times its aperture size (about twice of Length/Diameter ratio). This necessitates hundreds or thousands of fibers to couple to a 4-inch semiconductor wafer area.

SUMMARY OF THE INVENTION

The present invention discloses a method of coupling light into a power semiconductor device having a semiconductor structure with two or more layers. A patterned electrode layer is disposed on the surface of the semiconductor structure of the two or more layers. The method includes illuminating the power semiconductor device by directing a light from a light source through the patterned electrode layer to form an enhanced light coupling with the semiconductor structure. The power semiconductor device may have multiple cells of functionally identical units which may be linked by interconnects. In each unit device, the patterned electrode layer is configured to have a micron scaled grid pattern having multiple metal grids and aperture openings that is based on a distributed resistance model having two characteristic current decay lengths.

According to another embodiment, the light source may include but not restricted to an array of vertical-cavity surface-emitting laser (VCSEL), an array of pulsed laser diodes (LDs), and an array of micro-cavity Q-switched solid-state laser. The light source may be chosen according to light energy density required to pass through the micron scaled grid pattern having aperture openings.

According to another embodiment, the semiconductor structure of two or more layers may be a thyristor. The thyristor may be a four layer semiconductor structure including first, second, third and fourth semiconductor layers and the patterned electrode layer disposed above the first semiconductor layer. The first semiconductor layer and the third semiconductor layer have a first doping type and the second semiconductor layer and the fourth semiconductor layer have a second doping type. The first doping type of the first semiconductor layer and the third semiconductor layer is different from the second doping type of the second semiconductor layer and the third semiconductor layer. The doping type of the first and the third semiconductor layers may be P-type. The doping type of the second and the fourth semiconductor layers may be N-type.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

DETAILED DESCRIPTION OF THE INVENTION

The exemplary embodiments described herein in detail for illustrative purposes are subject to many variations in structure and design.

The terms, "semiconductor device", "power semiconductor device", are used interchangeably throughout the document.

The present invention discloses a method of coupling light into a power semiconductor device. The power semiconductor device may include a semiconductor structure with two or more layers and have a patterned electrode layer disposed on the surface of the semiconductor structure. The patterned electrode layer may be a patterned metal electrode layer. The power semiconductor device may be illuminated by directing a light from a light source through the patterned electrode layer to form an enhanced light coupling with the semiconductor structure. The power semiconductor device may have multiple cells of functionally identical units. In each unit device, the patterned electrode layer is configured to include a micron scaled grid pattern having metal grids and aperture openings according to the two characteristic current decay lengths of a distributed resistance model.

Figure 1:
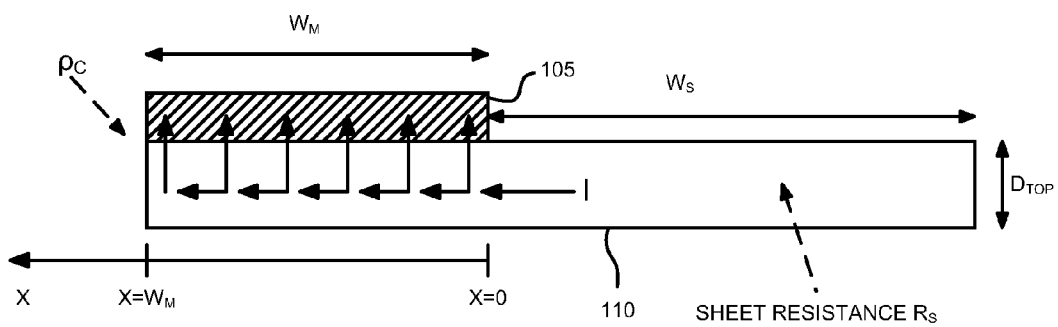
FIG. 1 illustrates an application of a simple distributed resistance model between a metal contact and an associated adjacent (heavily doped) conductive layer of a portion of a power semiconductor device, in the context of the present subject matter.

FIG. 1 illustrates an application of a simple distributed resistance model between a metal contact 105 and an associated adjacent (heavily-doped) conductive layer of a portion of a semiconductor device, in the context of the present subject matter. At the distributed resistance model 100, the region between the metal contact 105 and the conducting layer of the power semiconductor device 110 is assumed as the distributed resistive network. The associated adjacent conductive layer of the power semiconductor device 110 may be the first layer of the semiconductor structure of the two or more layers on which the metal electrode is disposed. The metal electrode is the metal contact 105. The metal electrode may have metal grids. Parameters of the distributed resistance model 100 may be a (sliced) contact resistance denoted by a specific contact resistance $\rho_c$, or a (sliced) semiconductor resistance denoted by a first layer sheet resistance $R_s$. The first layer sheet resistance $R_s$ is a sheet resistance of the conductive layer of the power semiconductor device. Metal half-grid width is denoted by $w_m$, metal half-grid spacing also known as aperture opening is denoted by $w_s$, total current of a unit device cell is denoted by $I_0$ and an effective thickness of the first layer of the power semiconductor device is denoted by $d_{top}$. The full grid-width and the full grid-spacing may be twice of what $w_m$ and $w_s$ represented in FIG. 1. According to one embodiment, the coordinate may be defined such that x=0 is located at the interface of the metal grids and the aperture opening, the x axis points to the left of the aperture opening.

Lateral current density along the width of the metal grid (x-axis) is given by $$J(x) = J_0 \cdot \frac{\sinh\left(\frac{w_m - x}{\lambda_m}\right)}{\sinh\left(\frac{w_m}{\lambda_m}\right)}, \quad (1)$$

where $\lambda_m = \sqrt{\rho_c / R_s}$ (2)

is the characteristic current decay length, $d_{top}$ is the effective thickness of the conductive layer of the power semiconductor device 110, and $I_0 = J_0 l d_{top}$ is the total current of the unit cell with the length of l inward. Thus, the (vertical) current density flowing into the metal grid through contact of the metal electrode and the conductive layer of the power semiconductor device 110 is given by $$J_c(x) = \frac{V(x)}{\rho_c} = J_0 \frac{d_{top}}{\lambda_m} \frac{\cosh\left(\frac{w_m - x}{\lambda_m}\right)}{\sinh\left(\frac{w_m}{\lambda_m}\right)}. \quad (3)$$

For large metal grid width, the current density through the contact of metal electrode is distributed as $$J_c(x) \sim \exp(-x/\lambda_m) \quad (4),$$

for $w_m \gg \lambda_m$.

Therefore, wider metal grid width $w_m$ beyond the characteristic current decay length $\lambda_m$ may not contribute much to the current conduction. Hence, an optimal metal grid width may be configured to achieve effective current conduction according to equation (2).

Figure 2:
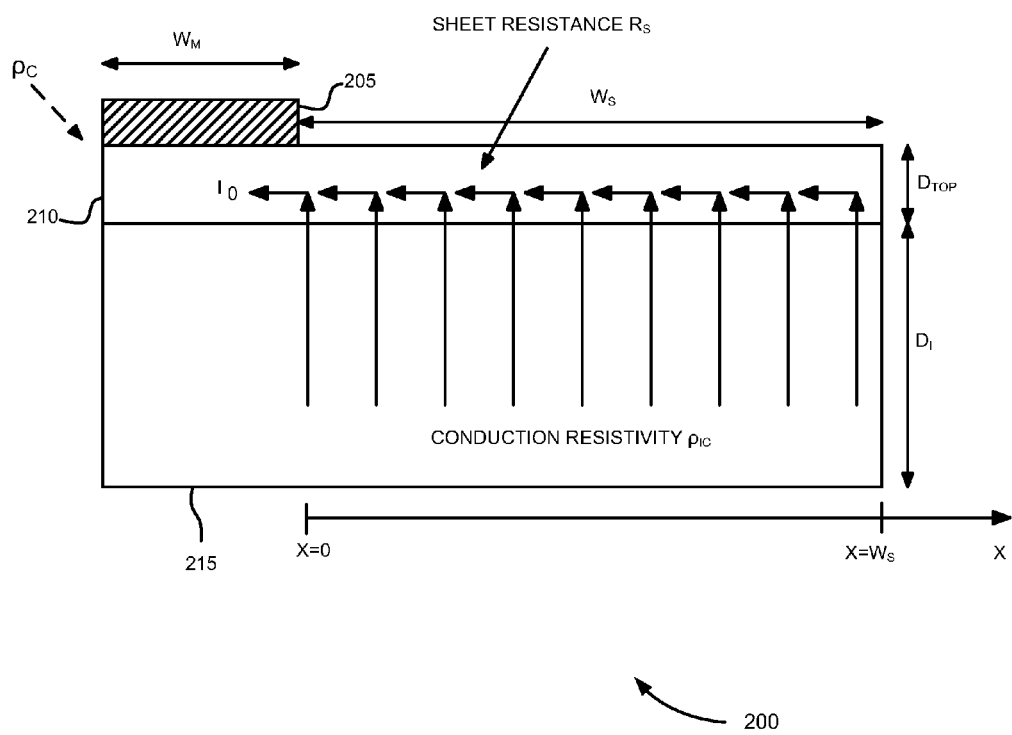
FIG. 2 illustrates another application of the simple distributed resistance model on the portion of the power semiconductor device having the (heavily-doped) conductive layer adjacent to the metal contact and blocking layers, according to an embodiment of the present subject matter.

FIG. 2 illustrates another application of the simple distributed resistance model 200 on the portion of the power semiconductor device having (heavily doped) conductive layer adjacent to the metal contact 205 and blocking layer 215, according to an embodiment of the present subject matter. The distributed resistance model 200 may be used to configure spacing of metal grids for optimizing light coupling and current conduction. The distributed resistance model 200 parameters may be on-state resistivity $\rho_{ic}$, and sheet resistance $R_s$ of the first semiconductor layer. Metal half-grid width is denoted by $w_m$, half-aperture opening is denoted by $w_s$, and total current flowing through the metal grid is defined by $I_0$ in a unit cell. The coordinate may be defined such that x=0 is located at the interface of the metal grids and the aperture opening, the x axis points to the right.

The current distribution under the aperture opening in the power semiconductor device may be modeled in a similar way by replacing the specific contact resistance with the effective ON-state conduction resistivity $\rho_{ic}$ during conduction state and the characteristic transition depth $d_{tr}$.

The lateral current distribution in the (heavily-doped) conductive layer 210 of the power semiconductor device under the aperture opening may be derived as $$J(x) = J_0 \cdot \frac{\sinh\left(\frac{w_s - x}{\lambda_s}\right)}{\sinh\left(\frac{w_s}{\lambda_s}\right)}, \quad (5)$$

where $J_0$ is the nominal average current density defined by total current density of the unit cell $$I_0 = J_0 lw \quad (6),$$

and the characteristic current decay length is given by $$\lambda_s = \sqrt{\frac{\rho_{ic} \cdot d_{tr}}{R_s}}. \quad (7)$$

The ON-state conduction resistivity $\rho_{ic}$ is the inverse of the conductivity during conduction state. According to one embodiment, the conductivity may be modulated by photo-generated carriers. According to another embodiment, the conductivity may be modulated by carrier injection due to gain for certain region of the semiconductor device. The characteristic transition depth $d_{tr}$ is used for applying the simple distributed resistance model 200. The characteristic transition depth $d_{tr}$ also defines a region of non-uniform current density distribution within the characteristic depth. The characteristic transition depth $d_{tr}$ may be selected based on the application and device type. The characteristic transition depth may be the transition length of non-uniform current distribution across the first layer of the power semiconductor device and the adjacent conductive layer. According to one embodiment, the transition length may be configured to the thickness of the first layer of the power semiconductor device, i.e., $d_{tr} = d_{top}$.

The upward current density in the transition region is given by $$J_{ic}(x) = \frac{V(x)}{\rho_{ic} d_{tr}} = J_0 \frac{d_{top}}{\lambda_s} \frac{\cosh\left(\frac{w_s - x}{\lambda_s}\right)}{\sinh\left(\frac{w_s}{\lambda_s}\right)}. \quad (8)$$

When the aperture opening width, $w_s$ is much large compared to the characteristic current decay length, $\lambda_s$, the current density distribution in the transition region of power semiconductor device is proportional to $$J_{ic}(x) \sim \exp(-x/\lambda_s) \quad (9).$$

When the aperture opening width $w_s$ is large beyond the characteristic current decay length $\lambda_s$, the contribution is small and diminishing away from the edge of the aperture. Hence an optimal aperture opening may be configured according to equation (7).

Figure 3:
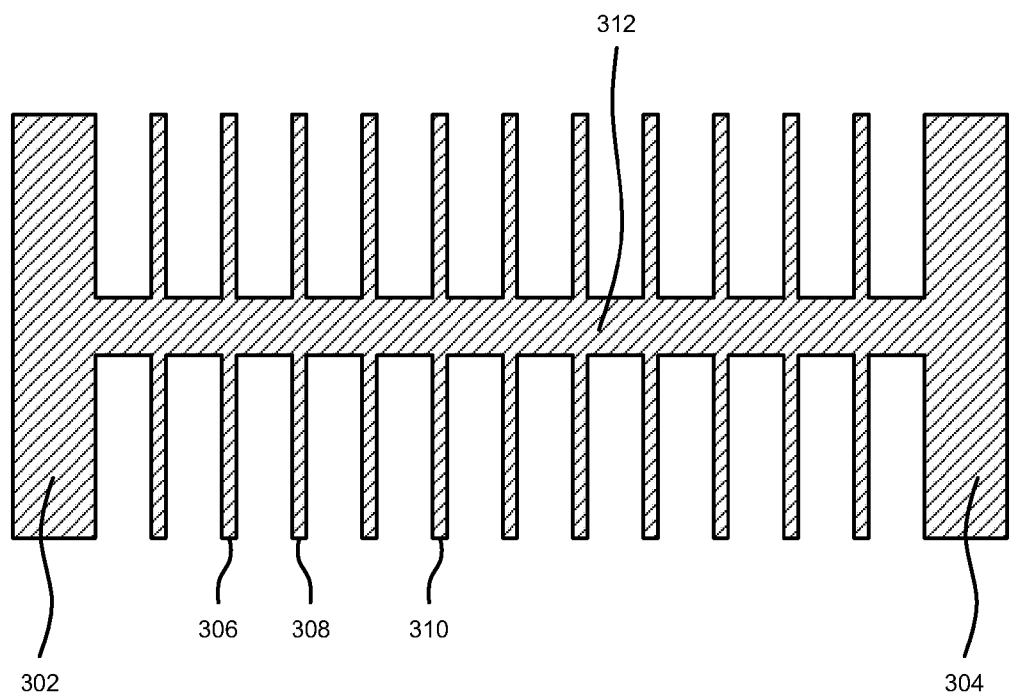
FIG. 3 illustrates a portion of a micron scaled metal grid pattern used in a power semiconductor device to enhance efficiency of both light reception and utilization of material for current conduction, according to an embodiment of the present subject matter.

FIG. 3 illustrates a portion of a micron scaled metal grid pattern 300 used in a power semiconductor device to enhance efficiency of both light reception and utilization of material for current conduction, according to an embodiment of the present subject matter. At 300, micron scaled metal grids 306, 308 and 310 are configured according to equations (2) and (7) in order to achieve optimal metal grid with and aperture opening. The optimal aperture opening may be used for efficient current conduction and light reception. The micron scaled metal grids 306, 308 and 310 are supported by the interconnect 312 to bond pads 302 and 304 at either ends for large-scale area devices.

According to one embodiment, the light source enters the conductive layer of the power semiconductor device through the spacing between the micron scaled metal grids 306, 308 and 310 present in the patterned electrode. The energy density required by the light to pass through the conductive layer of the power semiconductor device to illuminate the power semiconductor device is explained in further embodiments.

Figure 4:
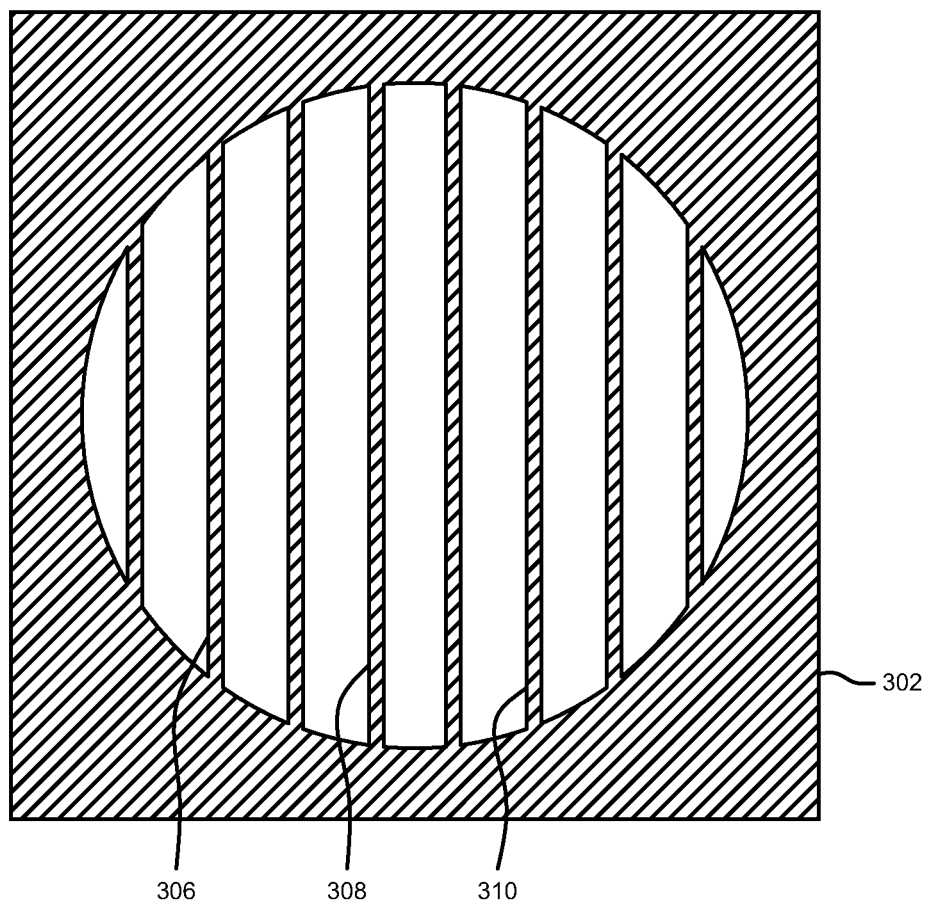
FIG. 4 illustrates the portion of the micron scaled metal grid pattern used in the power semiconductor device to enhance efficiency of both light reception and utilization of material for current conduction, according to an embodiment of the present subject matter.

FIG. 4 illustrates the portion of the micron scaled metal grid pattern 400 used in a power semiconductor device to enhance efficiency of both light reception and utilization of material for current conduction, according to an embodiment of the present subject matter. FIG. 4 shows a front view of the metal electrode including the micron scaled metal grids 306, 308 and 310 configured to achieve optimal aperture openings using equations (2) and (7).

Figure 5:
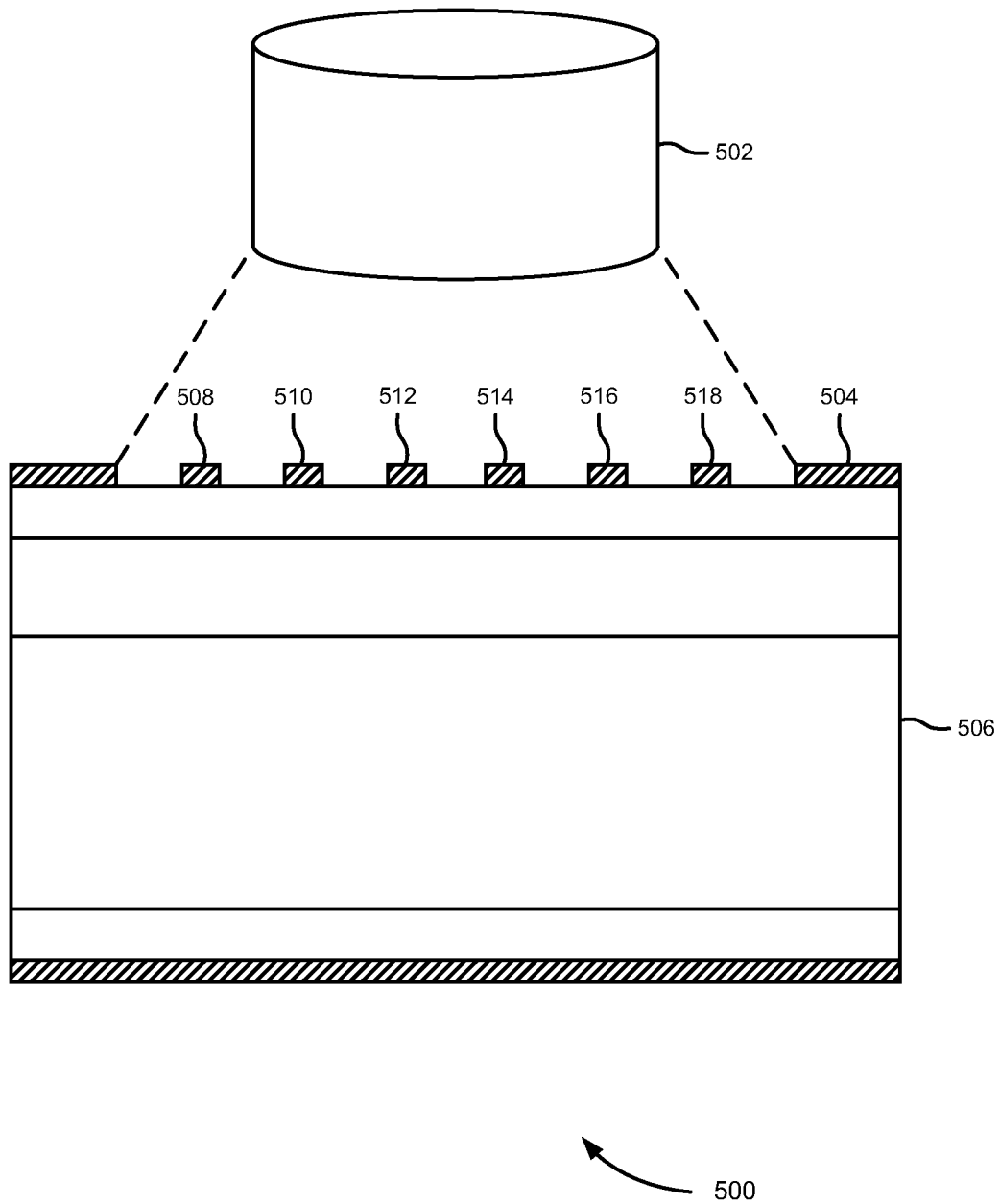
FIG. 5 illustrates a cross sectional view of fiber illumination on a portion of the power semiconductor device, according to an embodiment of the present subject matter.

FIG. 5 illustrates a cross sectional view 500 of fiber illumination on a portion of the power semiconductor device, according to an embodiment of the present subject matter. As shown in FIG. 5, the cross sectional view 500 includes a light source, such as an optical fiber 502, metal electrode 504 and a portion of semiconductor device 506. The metal electrode 504 further includes micron scaled metal grids 508, 510, 512, 514, 516, and 518.

The light may be introduced through an exit end of the optical fiber 502 at a distance from the surface of the semiconductor layer 506. The aperture of the semiconductor device 506 may be the metal electrode 504. The light may also be introduced from light sources such as an array of VCSELs, an array of pulsed LDs, and an array of micro-cavity Q-switched solid-state laser. According to one embodiment, light activated semiconductor switches may be triggered by the light required to illuminate the power semiconductor device.

Optical fiber may be capable of directing the light from the light source through the aperture openings of the micron scaled metal grids 508, 510, 512, 514, 516, and 518 present in metal electrode 504 disposed on the conductive layer. The relationship between the light energy density and carrier concentration is according to the following equation $$P_{light} = N_{carriers} \frac{hc}{\lambda} d(\lambda), \quad (10)$$

where $P_{light}$ is the light energy density (in J/cm2) required to create $N_{carriers}$ (in 1/cm$^3$), $\lambda$ is a wavelength of the light, d(λ) is thickness of the light activated semiconductor switch, h is a Planck's constant and c is speed of light.

The thickness of the light activated semiconductor switch d may be chosen to match the absorption length in semiconductors for a given wavelength. Hence the choice of the wavelength may be determined by the required voltage holding capability of the light activated semiconductor switch. Shorter wavelength presents more absorption, and therefore may be used for thinner devices, i.e., devices operated at low voltage.

According to one embodiment, an optical lens may be used to shape the light illuminated area coming from the optical fiber to correspond to the shape of the micron scaled grid pattern of the patterned metal electrode layer.

Figure 6:
FIGS. 6 & 7 are tables showing examples of characteristic current decay lengths of a metal grid and an aperture opening of the power semiconductor device with an N-type and P-type doping first layers, respectively, according to an embodiment of the present subject matter.
Figure 7:

FIGS. 6 & 7 are tables 600 and 700 showing examples of characteristic current decay lengths of the metal grid and the aperture opening of the power semiconductor device with an N-type and P-type doping in the first layers, respectively, according to an embodiment of the present subject matter. Consider an example referring to FIGS. 1 and 2 where the effective thickness of first layer $d_{top}$ is 25 µm, and the sheet resistance of the first layer of power semiconductor device may be in the range of 1.1 to 4.7 Ω/sq for N-type doping. Table 600 shows different characteristic current decay lengths for N-type doping in the first layer with the transition length of current distribution between the first layer and blocking layer set to be the same as the effective thickness of the first layer, and a typical specific contact resistance of $\rho_c=1\times10^{-6}$ Ω-cm² in silicon based semiconductor devices. For instance, when the peak doping in N-type semiconductor is $5\times10^9$ cm$^{-3}$, the sheet resistance is about 2.16 Ω/sq. The characteristic current decay length for metal and the characteristic current decay length for semiconductor are obtained by substituting values in equations (2) and (7). In this example, the characteristic current decay length obtained for metal is 6.8 µm and the characteristic current decay length obtained for semiconductor is 34.1 µm.

For P-type doping, the sheet resistance of the first layer semiconductor device may be in range of 2.2 to 9.8 Ω/sq. Table 700 shows different characteristic current decay lengths for P-type doping in the first layer with the transition length of current distribution between the first layer and the blocking layer set to be the same as the effective thickness of first layer, and a typical specific contact resistance of $\rho_c=1\times10^{-6}$ Ω-cm² in silicon based semiconductor devices. The characteristic current decay length for metal and the characteristic current decay length for semiconductor are obtained by substituting values in equations (2) and (7).

Tables 600 and 700 shows the characteristic current decay lengths of the metal grid and the opening of the aperture for the current density dropping to 1/e of its peak value. According to one embodiment, the full grid-width and the full grid-spacing are twice of $w_m$ and $w_s$, respectively, due to inherent symmetric current flow. According to another embodiment, the characteristic current decay lengths set limits on maximum grid half-width and half-spacing.

According to another embodiment, for a given specific contact resistance, the characteristic current decay length may define a reasonable range of grid half-widths. Typically, the grid half-width is usually set to be less than the characteristic current decay length for better transparency. The grid half-width is maintained so as the current may crowd around the vicinity of metal contact and the aperture opening interface. When the average current density inside the bulk of semiconductor device is high, the current density near the interface of the patterned metal electrode and the aperture opening may go beyond the limit of the contact and it may be difficult for the semiconductor device to handle its heat or cause electro-migration The grid half-width is usually set to be less than the characteristic current decay length for better transparency. One good indicator is the voltage drop across an Ohmic contact. The Ohmic contact may be defined as a non-rectifying junction in the semiconductor device that may be prepared so that the current-voltage (I-V) curve of the region is linear and symmetric. Usually ohmic contact may be a metal-semiconductor junction between a metal contact and the semiconductor device. The voltage drop across the ohmic contact with a current density $J_c$ is $$V_c = \rho_c J_c \tag{11}$$

If the voltage drop across the metal contact is limited to 1 Volt, the maximum current density allowed is about $J_c=1\times10^6$ A/cm² for the specific contact resistance of $\rho_c=1\times10^{-6}$ Ω-cm². The maximum current density occurs at the vicinity of the interface of metal contact and aperture opening, is, $$J_c^{max} = J_c(x=0) = J_0 \frac{d_{top}}{\lambda_m} \frac{\cosh\left(\frac{w_m}{\lambda_m}\right)}{\sinh\left(\frac{w_m}{\lambda_m}\right)} \tag{12}$$

wherein $J_0$ is the nominal current defined through the total current $I_0=J_0 l d_{top}$. Under the given current density across the bulk of semiconductor $J_s$, the total current is given by $$I_0 = J_s l w_s \tag{13}$$

Therefore, the maximum current density in the power semiconductor device is $$J_c^{max} = J_s \frac{w_s}{\lambda_m} \frac{\cosh\left(\frac{w_m}{\lambda_m}\right)}{\sinh\left(\frac{w_m}{\lambda_m}\right)} \tag{14}$$

And the maximum half grid spacing for a given current density $J_s$ and half grid width $w_m$ is determined by, $$w_s = \lambda_m \frac{J_c^{max}}{J_s} \frac{\sinh\left(\frac{w_m}{\lambda_m}\right)}{\cosh\left(\frac{w_m}{\lambda_m}\right)} \tag{15}$$

Figure 8:
FIGS. 8 & 9 are tables showing another example of characteristic current decay lengths of the metal grid and the aperture opening of the power semiconductor device with an N-type and P-type doping first layers, respectively, according to an embodiment of the present subject matter.
Figure 9:

FIGS. 8 & 9 are tables 800 and 900 showing another example of characteristic current decay lengths for the metal grid and the aperture opening of the power semiconductor device with the N-type and P-type doping in the first layers, respectively, according to an embodiment of the present subject matter. Tables 800 and 900 illustrate the half grid-spacing of the aperture opening for N-type first layer and P-type first layer, respectively, according to an example when the half grid width is set to 3.0 µm. The maximum current density of metal contact $J_c$ and the maximum current density of the semiconductor device $J_s$ are limited to 1 (mega ampere) MA/cm2 and 100 (kilo ampere) kA/cm2, respectively. The characteristic current decay length for the grid spacing may be calculated using equation (15).

Figure 10:
FIG. 10 is a table illustrating light requirement for various wavelengths and the thicknesses of P-type doped layer and the intrinsic layer, accordingly to an embodiment of the present subject matter.

FIG. 10 is the table 1000 illustrating light requirement for various wavelengths and the thicknesses of the P-type doped, first layer and the intrinsic layer, accordingly to an embodiment of the present subject matter. The table 1000 shows the light requirement for various wavelengths and various thicknesses when the thickness of a P-type doped, first layer and an intrinsic (I) layer are adjusted such that absorption of light in the P doped layer is not more than 10% and the absorption of light in the I-layer is 60%.

For instance, a light energy density of up to 3.1 mJ/cm$^2$ (denoted by $P_{light}$ in table 1000) may be required for a wavelength of 1064 nm. At shorter wavelengths, significant reductions in the light energy density may be observed. For instance, at 980 nm wavelength, the light energy density required is about 0.5 mJ/cm$^2$ to generate the same amount of carriers. The reduction in the light energy density may be due to an increase of light absorption at short wavelength.

Figure 11:
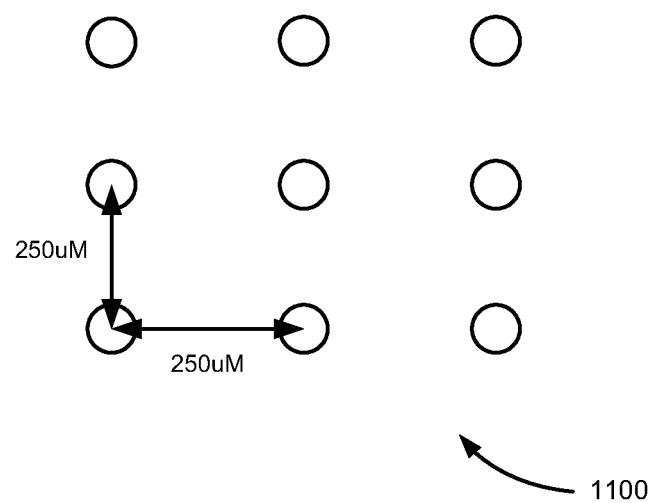
FIG. 11 is a schematic representation showing a 2D array of VCSEL according to an embodiment of the present subject matter.

FIG. 11 is the schematic representation showing a 2D array of VCSEL according to an embodiment of the present subject matter. At 1100 the VCSEL emitters are disposed at about 250 micrometer (um) apart in horizontal direction and vertical direction to generate the required light energy density for triggering the light activated semiconductor switches. The VCSELs are mostly available for operation in the wavelength range of 780 (nanometer) nm to 980 nm, although other wavelengths are available. The 2D array of VCSEL may operate in the quasi-continuous wave (CW) range. According to one embodiment, pulse width in quasi CW range is considered to generate required light energy density. The quasi CW range may generate a succession of pulses at high repetition rate. In quasi CW range, the light source may be switched on for specific intervals which may reduce thermal effects significantly. Duty cycle may be a percentage of the switch on time of the light source. The pulse width in quasi CW range may be 1 microsecond (us) to 100 us. According to another embodiment, in CW mode, the average power of the 2D array is up to 10 W or about 25 mW per VCSEL.

The amount of light generated by the 2D array of VCSEL is given by:

$$E = N \cdot M \cdot P_{peak} dt \quad (16)$$

where E is the total energy produced by the array, N and M are the number of emitters in the horizontal and vertical direction, respectively, $P_{peak}$ is the peak power of a single emitter and dt is the pulse width.

Figure 12:
FIG. 12 illustrates a table including a summary of available energy from the VCSEL array (E) for various pulse widths between 10 and 100 us as well as the size of an array required to produce the needed light shown in the table in FIG. 10, according to an embodiment of the present subject matter.

FIG. 12 illustrates the table 1200 including a summary of available energy from the VCSEL array (E) for various pulse widths between 10 and 100 us as well as the size of an array required to produce the needed light shown in the table in FIG. 10, according to an embodiment of the present subject matter. Table 1200 summarizes energy (E) available from the VCSEL array. The energy (E) may be calculated using equation (16). In this example, energy (E) is calculated for pulse widths between 10 and 100 us, for various array sizes as shown in the table 1200. Duty cycle is assumed to be 1%. The maximum repetition rate $RR_{max}$ that may be used corresponding to the duty cycle is also indicated in table 1200.

For instance, for 980 nm wavelength and 50 us pulse width, and 9×9 array (i.e., an array whose nine emitters are placed in either horizontal and vertical dimensions) whose array size is 0.225×0.225 cm produces enough energy to generate 10$^{17}$ carriers per cm$^3$ as previously calculated in table 1000.

For pulse width shorter than 10 us, scaling the VCSEL array to larger dimension may be needed. Scaling the array to 1×1 cm shows that enough energy may be generated for pulse width as low as 2.5 us.

Figure 13:
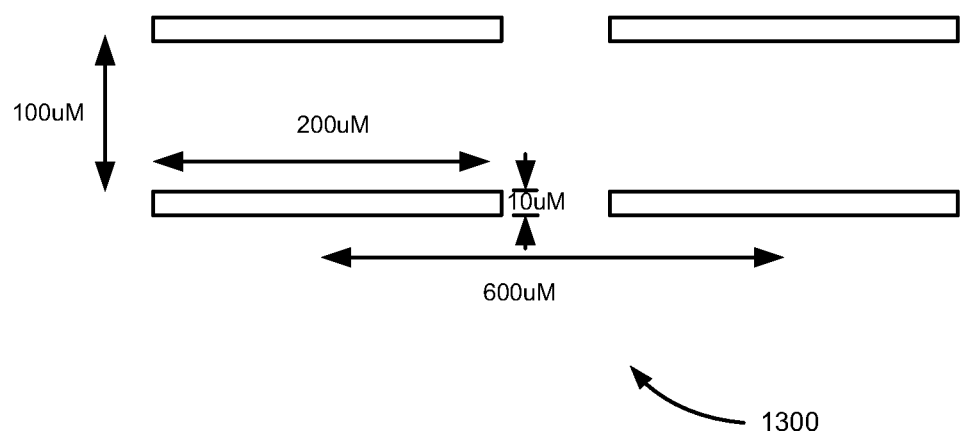
FIG. 13 is a schematic showing a 2D array of laser diodes according to an embodiment of the present subject matter.

FIG. 13 is the schematic showing a 2D array of laser diodes 1300 according to an embodiment of the present subject matter. The 2D array of laser diodes are disposed at about 600 um in horizontal direction and about 100 um in vertical direction to generate the needed light energy for triggering the light activated semiconductor switches. The size of each laser diode may be 10×200 um. The laser diodes may have pulse widths in nanosecond range of 1 ns to 1 us. Laser diodes may be optimized for high peak power and short pulses (<1 us), and the duty cycle may be limited to 0.1%.

Figure 14:
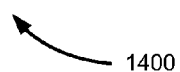
FIG. 14 is a table showing available energy from a 1×1 centimeter array of laser diodes for various pulse widths and size of the array required to produce the amount of light derived per the table of FIG. 10, according to an embodiment of the subject matter.

FIG. 14 is the table 1400 showing available energy from a 1×1 centimeter array of laser diodes for various pulse widths and size of the array required to produce the amount of light derived per the table of FIG. 10, according to an embodiment of the subject matter. The array of laser diodes may be used for wavelength of 980 nm or shorter than that.

Figure 15:
FIG. 15 is a table showing the energy that can be generated by an array shown in table 1000 of FIG. 10 and the size of the array required to provide enough energy for triggering the light activated semiconductor switches, according to an embodiment of the present subject matter.

FIG. 15 is the table 1500 showing the energy that can be generated by an array shown in table 1000 of FIG. 10 and the size of the array required to provide enough energy for triggering the light activated semiconductor switches, according to an embodiment of the present subject matter. At table 1500 it may be observed that array size of less than 1×1 cm is needed for operation at 1064 nm.

According to one embodiment, for very short pulses (<1 ns), laser diodes may not be suitable due to the complexity of electronic and limited peak power. In this range, an array of Q-switched cavity-dumped microchip lasers may be used. Each laser in the array of Q-switched cavity dumped microchip laser is only 100 um in size. Large arrays may be built without tight alignment constraints. Pulse width is adjustable in the 10-1000 ps range depending on the cavity size. For 10 ps pulse, each Q-switched cavity dumped microchip laser produces 2.5 uJ of energy. For longer pulse width, the cavity size may be increased as well as the size of the gain medium, hence higher energy may also be obtained. For illustration purpose it may be assumed that the energy is constant with the pulse width. The emission wavelength may be assumed as 1064 nm. According to one embodiment, in array form, laser spacing may be 250×250 um.

Figure 16:
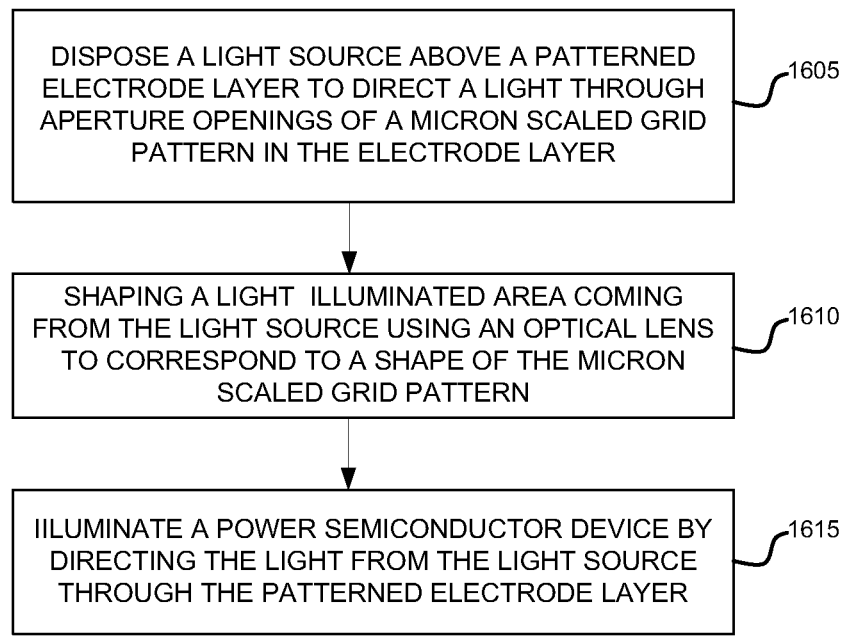
FIG. 16 is a flow diagram illustrating a method of coupling light into the power semiconductor device, according an embodiment of the present subject matter.

FIG. 16 is a flow diagram illustrating a method of coupling light into the power semiconductor device according to an embodiment of the present subject matter. At process block 1605, a light source is disposed above a patterned electrode layer to direct the light through the aperture openings of a micron scaled grid pattern in the patterned electrode layer. The light may be directed through the aperture openings of the micron scaled grid pattern in the patterned electrode layer into the semiconductor structure. At process block 1610, a light illuminated area coming from the light source is shaped using an optical lens to correspond to a shape of the micron scaled grid pattern. The light source may be an optical fiber. At process block 1615, a power semiconductor device is illuminated by directing the light from the light source through the patterned electrode layer. The power semiconductor device may have the semiconductor structure with the two or more layers on which the patterned electrode layer is disposed on the surface.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A method of coupling light into a power semiconductor device having a semiconductor structure with two or more layers, including multiple cells of identical units, and having a patterned electrode layer that is disposed on the surface of the semiconductor structure, comprising:

illuminating the power semiconductor device by directing a light from a light source through the aperture openings in the patterned electrode layer to form an enhanced light coupling with the semiconductor structure, wherein the patterned electrode layer is configured to have a micron scaled grid pattern having multiple metal grids and aperture openings based on a distributed resistance model having characteristic current decay lengths for the metal grids and the aperture openings, wherein the width of the metal grids is configured according to $\lambda_m = \sqrt{\rho_c/R_s}$, and wherein the aperture openings between the metal grids are configured according to $\lambda_s = \sqrt{\rho_{ic} \cdot d_{tr}/R_s}$, where $\lambda_m$ is the characteristic current decay length of the metal grids, $\lambda_s$ is the characteristic current decay length of the aperture openings, wherein $\rho_c$ is a specific contact resistance of the contact, $R_s$ is a sheet resistance of the first layer of the power semiconductor device, $\rho_{ic}$ is an effective ON-state resistance below the first layer of the power semiconductor device, and $d_{tr}$ is a transition length of non-uniform current distribution across the first layer of the power semiconductor device and an adjacent conductive layer.

2. The method of claim 1, wherein $\lambda_m$ and $\lambda_s$ are derived from the distributed resistance model for given power semiconductor device parameters.

3. The method of claim 1, wherein the transition length $d_{tr}$ is configured to the effective thickness $d_{top}$ of the first layer of the power semiconductor device.

4. The method of claim 1, wherein the patterned electrode layer is a patterned metal electrode layer.

5. The method of claim 1, further comprising:

disposing the light source above the patterned electrode layer to direct the light through the aperture openings of the micron scaled grid pattern in the patterned electrode layer into the semiconductor structure.

6. The method of claim 1, wherein the light source is selected from a group consisting of an optical fiber, an array of vertical-cavity surface-emitting lasers, an array of pulsed laser diodes, and an array of micro-cavity Q-switched solid-state laser.

7. The method of claim 6, wherein the array of vertical-cavity surface-emitting lasers operate in a wavelength range of 780 nanometer (nm) to 980 nm.

8. The method of claim 6, wherein the array of the vertical-cavity surface-emitting lasers are separated by about 250 micrometer (um) in a horizontal direction and a vertical direction.

9. The method of claim 6, wherein the array of pulsed laser diodes have pulse widths approximately in a range of 1 nanosecond (ns) to 1 microsecond (us).

10. The method of claim 6, wherein the array of pulsed laser diodes are separated by about 600 um in a horizontal direction and by about 100 um in a vertical direction.

11. The method of claim 1, wherein the light source is configured to direct light energy density (J/cm$^2$) through the aperture openings in the micron scaled grid pattern in a conductive layer of the power semiconductor device based on the following equation:

$$P_{light} = N_{carriers} \frac{hc}{\lambda} d(\lambda),$$

wherein $P_{light}$ is a light energy density (in J/cm2) required to create $N_{carriers}$ (in 1/cm$^3$), $\lambda$ is a wavelength of the light, $d(\lambda)$ is a thickness of a light activated semiconductor switch, h is a Planck's constant and c is speed of light.

12. The method of claim 1, further comprising:

shaping the light illuminated area coming from the optical fiber using an optical lens to correspond to the shape of the micron scaled grid pattern of the patterned electrode layer.

* * * * *